United States Patent Office 3,263,406
Patented August 2, 1966

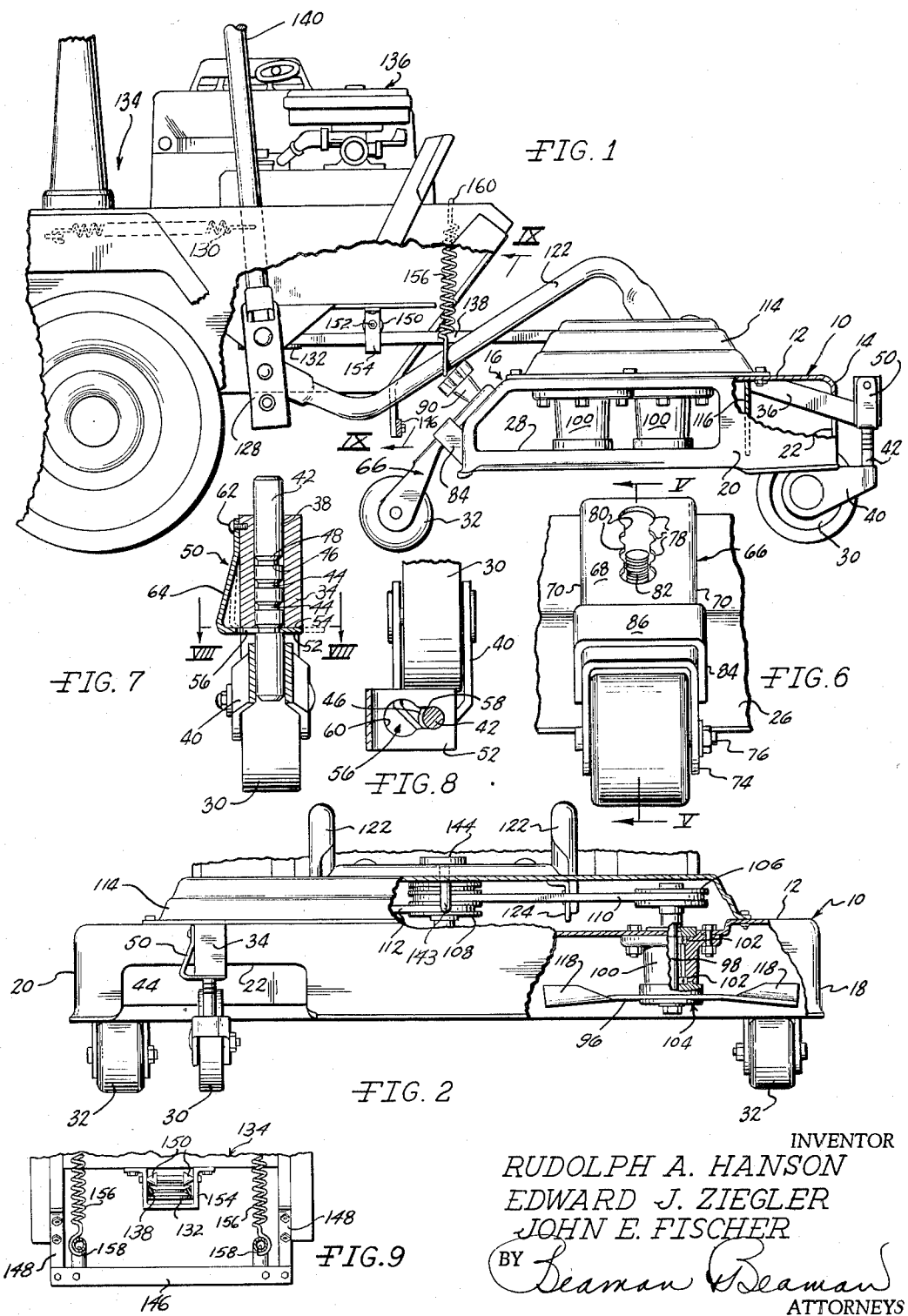

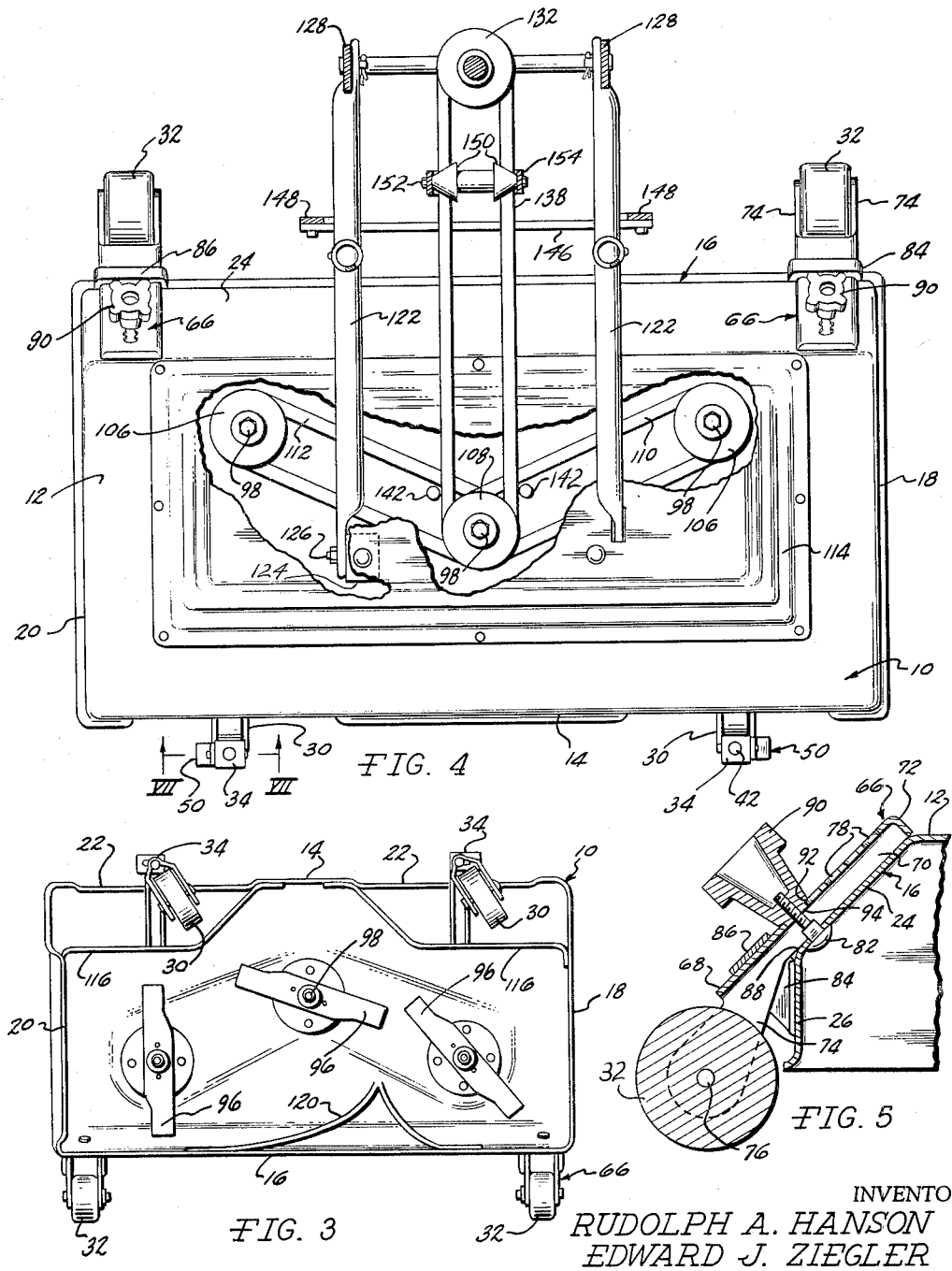

3,263,406
FRONT MOUNTING FOR ROTARY TYPE MOWER
Rudolph A. Hanson, Edward J. Ziegler, and John E. Fischer, Jackson, Mich., assignors to Yard-Man, Inc., Jackson, Mich., a corporation of Michigan
Filed Sept. 4, 1964, Ser. No. 394,465
7 Claims. (Cl. 56—25.4)

The invention pertains to a rotary lawn mowing attachment, and particularly relates to a self-supporting rotary lawn mower attachment adapted to be mounted at the front of a lawn tractor.

Rotary lawn mower attachments are commonly employed with light-duty tractors usually known as "lawn" tractors, wherein the attachment may be mounted upon the tractor and powered by the tractor engine. In that lawn tractors are often used for other purposes than mowing, it is desirable that the lawn mower attachment be readily removed from the tractor.

The most common means of attaching a rotary lawn mower attachment to a lawn tractor having front and rear wheels is to entirely or partially support the attachment on the tractor intermediate the front and rear wheels, whereby the attachment is disposed directly below the operator. This type of tractor mounting is objectionable for several reasons. First, in that the lawn mower attachment is located directly below the operator, it is necessary for the operator to direct his vision downwardly to continuously observe the position of the lawn mower. The operator must, therefore, continuously shift his vision from in front of the tractor to observe the tractor's movements to the mower attachment directly below him. This shifting of vision is particularly noticeable and objectionable when trimming close to obstacles where unusually accurate control of the tractor movement is required to avoid collisions with trees, shrubs, etc. A second disadvantage of the lawn mower attachment being located between the front and rear wheels of the lawn tractor results from the compression of the uncut grass by the front wheels of the tractor prior to the cutting operation. As the front wheels of the tractor pass over the uncut grass, the grass will be compressed and may not be lifted sufficiently by the mower blades to produce proper cutting. Excessive compression of the grass is particularly present when the grass is high in moisture content and it does not immediately "spring" back to its normal position after the tractor wheels have passed thereover.

Another important disadvantage present with most tractor-powered rotary mower attachments results from the fact that the attachment is usually entirely or partially supported by the tractor, itself. Thus, the relationship of the cutting blades to the ground will be, to some extent, determined by the terrain engaged by the tractor wheels. As the tractor wheels are remotely located from the lower attachment, "scalping" and uneven heights of cut often result.

It is, therefore, an object of the invention to provide a rotary lawn mower attachment for use with lawn tractors and powered lawn mower devices wherein the attachment may be mounted at the front of the tractor within the normal field of vision and provide superior visibility characteristics.

Another object of the invention is to provide a rotary lawn mower attachment which is self-supporting and may be mounted upon the front of a tractor or powered device whereby the mower will cut grass prior to the wheels of the tractor passing thereover, and a uniform height of cut will always occur.

Another object of the invention is to provide a rotary lawn mower attachment which is supported upon roller and wheel means and adjustment means are provided with the rollers and wheels to permit easy vertical adjustment of the attachment to vary the height of grass cut.

Another object of the invention is to provide a rotary lawn mower attachment for lawn tractors, and the like, wherein a plurality of rotary blade spindles are employed and guided belt means are used to interconnect the spindles with each other and with the power source.

A further object of the invention is to provide a rotary lawn mower attachment adapted to be affixed to a front wheel drive lawn tractor, wherein a portion of the mower attachment weight is transferred to the tractor drive wheels and wherein belt guide means guide the belt driving the mower blades.

Yet a further object of the invention is to provide a rotary lawn mower attachment of economical pressed steel construction employing a plurality of blades wherein the grass clippings are so transported to the cutting housing that "windrowing" is minimized.

These and other objects of the invention arising from the details and relationships of the components of an embodiment thereof will be apparent from the following description and accompanying drawings wherein:

FIG. 1 is an elevational, detail, side view of a rotary lawn mower attachment as mounted upon the front of a lawn tractor, portions being cut away for purposes of illustration, FIG. 2 is a front elevational view of the rotary lawn mower attachment, a portion of the housing and spindle being cut away to provide a partial diametrical section of a blade spindle.

FIG. 3 is an underside view of the rotary lawn mower attachment in accord with the invention, FIG. 4 is a plan view of the lawn mower attachment, portions of the upper belt guard shroud being cut away, FIG. 5 is an elevational, sectional view of the rear roller adjustment as taken along section V—V of FIG. 6, however, illustrating the knob nut, FIG. 6 is an enlarged, rear, elevational, detail view of the rear roller adjustment, the knob nut not being shown, FIG. 7 is a diametrical, sectional, enlarged view of the front wheel adjustment as taken along section VII—VII of FIG. 4, FIG. 8 is a plan, detail, sectional view taken along section VIII—VIII of FIG. 7, and FIG. 9 is a sectional, elevational view taken along section IX—IX of FIG. 1.

The front mounted rotary lawn mower attachment in accord with the invention includes a formed or pressed sheet metal housing 10, the configuration of which will be apparent from FIGS. 1 through 4. The housing 10 is substantially rectangular in form, having an upper panel 12 from which depends a front panel 14, a rear panel 16, and side panels 18 and 20. As will be apparent from FIG. 2, the central region of the upper panel is recessed to minimize the overall height of the mower attachment.

The front panel of the mower is provided with a pair of openings 22, one of which appears in FIG. 2, providing clearance of the front mower attachment wheels, and the rear panel 16 consists of an obliquely related portion 24 from which depends the vertical portion 26. The purpose of the obliquely depending portion 24 will be later described. The side panel 18 is closed and the side panel 20 is provided with a grass cutting discharge opening 28, as will be apparent from FIG. 1.

The rotary lawn mower attachment in accord with the invention is self-supporting, whereby the attachment will be uniformly related at all times to the immediate terrain being cut. This arrangement prevents "scalping" and produces a uniform height of grass cut regardless of variation in the terrain. The support of the mower attachment is provided by a pair of front wheels 30 and a pair of rear wheels or rollers 32. The front wheels 30 are each supported upon the front of housing 10 by a web 36 welded to the housing, FIG. 1. The webs 36 each extend through the adjacent opening 22 and each is provided at the end with a vertically disposed bearing block 34 having a vertical bore 38 defined therein. Each of the wheels 30 is rotatably mounted upon a yoke 40 which is affixed to a shaft 42. Each shaft 42 is rotatably received within the bore 38 of a bearing block 34, and is provided with a plurality of axially spaced annular grooves 44. As will be appreciated from FIG. 7, each groove 44 includes a lower shoulder 46 which is disposed at right angles to the axis of the shaft 42 and an upper shoulder 48 which is obliquely related to the shaft axis. The retainer for the shafts 42 consists of a formed sheet metal element 50 constructed of spring steel or similar material having a configuration which will be apparent from FIG. 7. The element 50 includes a horizontally disposed portion 52 adapted to be disposed adjacent the lower surface 54 of the associated bearing block 34. A keyhole-shaped opening 56 is defined in the element portion 52, FIG. 8, having an elongated portion 58 adapted to be closely received within an aligned shaft groove 44 wherein the distance separating the parallel spaced sides of the portion 58 is only slightly greater that the minimum diameter of the grooves 44. The circular portion 60 of the opening 56 is of a diameter larger than the associated shaft 42 whereby alignment of the opening 56 with the shaft 42 will permit the shaft to be freely axially positioned within the bearing block bore 38. The element 50 is attached to the associated block 34 by a screw 62, and is formed outwardly at portion 64 to provide clearance for deflecting the element to align the opening portion 60 with the shaft 42, as shown in the dotted line position of FIG. 7. It will, therefore, be appreciated that upon deflecting the element 50 to the dotted line position of FIG. 7, the shafts 42 may be very easily axially positioned within the associated bearing block 34, and that upon alignment of a groove 44 with the element portion 52, releasing the element 50 will permit the opening portion 58 to be received within the aligned groove. Thus, the weight of the mower attachment borne by each of the wheels 30 will be transferred from the blocks 34 to the element portions 52 and to the shafts 42 through the shaft shoulder 46. By employing the beveled groove surfaces 48, alignment of the portions 52 with a recess 44 is facilitated. It will also be noted that the aforedescribed adjustable mounting for the wheels 30 permits the shafts 42 to freely pivot within the bearing blocks 34 whereby the wheels 30 will be swivelly mounted at each vertical adjustment thereof.

The rear mower attachment wheels 32 are each rotatably mounted upon a formed sheet metal support bracket 66 which includes a channel-shaped portion having a base 68 and sides 70. The upper end of the channel is also enclosed by the depending flange portion 72, FIG. 5. The longitudinal side portions 70 of each wheel bracket 66 are extended at 74 to provide a yoke for receiving a wheel 32 therebetween which is rotatably mounted on the axle pin 76. The base 68 of the bracket is provided with a plurality of cylindrical holes 78 diametrically interconnected by an elongated slot 80, FIG. 6. A carriage bolt 82 is affixed to the housing rear panel portion 24 and is adapted to be received within the bracket slot 80. A sheet metal strap 84 is attached to the housing bracket portion 26 and is so formed that the strap portion 86 is disposed parallel to the housing portion 24 and is spaced thereabove whereby a rear wheel bracket 66 may be inserted under the strap portion 86 so that the lower edges 88 of the bracket sides 70 engage the housing portion 24.

An adjustment knob nut 90 is adapted to be threaded on the bolt 82. The knob 90 includes a rear wheel bracket engageable surface 92, and is provided at its lower end with a cylindrical boss 94 concentric to the threaded bore of the knob and which is of a diameter only slightly less than the diameter of the bracket holes 78. Upon the center of a hole 78 being aligned with the bolt 82, the knob 90 may be rotated to insert the boss 94 into the aligned hole 78 and, thus, press the bracket 66 into firm engagement with the housing portion 24 to produce the desired adjustment of the associated rear wheel 32. To change the vertical adjustment of the wheels 32 relative to the housing 10, the operator unscrews the knob 90 sufficiently to remove the knob boss from the associated hole 78. The bracket 66 may then be freely positioned on the housing portion 24 in a vertical direction, in that the bolt 82 is aligned with the slot 80 and, thus, offers no hindrance to adjustment of the bracket. Upon alignment of the bolt 82 with the center of the desired hole 78, the knob 90 is retightened to affix the rear wheel bracket to the housing.

It will be appreciated that the aforedescribed adjustable mountings of the front wheels 30 and the rear wheels 32 permit the supporting wheels of the mower attachment to be very quickly adjusted to vary the height of the cut. The adjustment means permit the rear wheels 32 to be rigidly attached to the housing, while the mounting means of the front wheels 30 provide a swiveling action which facilitates steering and guiding of the mower housing.

The grass entering the housing 10 is cut by three blades rotating in a horizontal plane. Each of the blades 96 is mounted upon its own vertically disposed shaft 98 which is rotatably supported within a bearing housing 100 affixed to the underside of the recessed upper housing panel 12, FIG. 2. The bearing housings 100 each include a pair of spaced anti-friction bearings rotatably supporting a shaft 98 and appropriate blade mounting means 104 are affixed to the lower portion of each shaft 98 whereby the blade may be frictionally affixed to the shaft for rotation therewith. The upper portion of each outside shaft 98 is provided with a pulley 106 of the V-belt type. As will be noted from FIGS. 3 and 4, the three shafts 98 are arranged in a nonlinear manner whereby the central blade 96 will be disposed ahead of the outside blades. This arrangement permits the swath cut by the outside blades to slightly overlap the cutting swath of the central blade without necessitating synchronization of the blades. In that the blades need not be synchronized, conventional V-belting may be employed to connect the single groove outside pulleys 106 of the outside shafts to the three-groove pulley 108 attached to the central shaft 98. A V-belt 110 connects one of the outside pulleys 106 to the central pulley 108, and a V-belt 112 connects the other outside pulley to the central pulley. The pulleys and the belting associated therewith are enclosed by a shroud 114 bolted to the upper panel 12 whereby the moving parts of the mower attachment will be totally enclosed.

To provide optimum grass cutting and clipping disposal, a pair of vertically disposed baffles 116 are included within the housing disposed immediately behind the front wheels 30, FIGS. 1 and 3. The baffles 30, in addition to providing improved air flow characteristics within the housing 10, also aid in preventing obstacles struck by the blades from being thrown through the openings 22. The cutting blades 96, in addition to including a cutting edge, include upturn portions 118 which tend to create a vacuum below the blades and "lift" the grass during the cutting action. The air flow within the housing produced by the blades will keep the grass cuttings within the housing until they are discharged from the cutting opening 28. To direct the clippings toward the opening 28, a baffle 120, FIG. 3, is included in the housing to aid in directing the clippings cut by the blade furtherest from the opening 28, and the central blade, toward the opening 28. The use of the baffle 120 prevents undesirable "windrowing" of the clippings cut by the blades which are not disposed adjacent the housing opening 28.

In that the mower attachment in accord with the invention is normally mounted on the front of a front wheel drive tractor, it will be pushed along the lawn being cut. The attachment of the mower to the tractor is through a pair of tubular arms 122 being flattened at each end. At the mower-attached end of the arms 122, the arms are pivotally connected to the vertically disposed brackets 124, which are mounted on the housing by a shouldered bolt 126. As noted in FIG. 4, openings are provided in shroud 114 to permit the arms to be connected to brackets 124. At the tractor-mounted end of the arms 122, the arms are pivotally mounted to a pair of spaced levers 128 pivotally mounted on the tractor for movement in a direction toward and away from the mower attachment. The levers 128 are operated by a lever 140 and a spring 130 biases the lever 140 rearwardly, thereby tending to bias the levers 128 in a direction toward the mower attachment to move the mower attachment away from the drive pulley 132. The tractor 134 includes an engine 136 rotating the drive pulley 132. A V-belt 138 is mounted on the central blade shaft pulley 108 and the engine drive pulley 132, and the biasing force of the spring 130 maintains the belt 138 tight to establish a driving connection between the engine and the blade shafts 98. To disengage the power to the mower attachment, the lever 140 is pivoted to pull the mower attachment toward the tractor and thereby loosen the belt 138. To maintain the belt 138 on the central pulley 108, side guide pins 142 are mounted on the housing 10 and extend adjacent the pulley 108 to prevent the belt from disengaging from the pulley 108 when the belt is in the unloosened or "declutched" position. A front guide pin 143, FIG. 2, prevents the belt from coming off the front of pulley 108. Pin 143 is mounted on a plate 144 which is removably mounted on the top of shroud 114 by screws, not shown.

In that the arms 122 are pivotally mounted to the tractor levers 128, and to the brackets 124, the mower attachment is capable of considerable vertical displacement relative to the tractor. To prevent excessive downward movement of the mower attachment relative to the tractor 134, a bar 146 depends from tractor mounted brackets 148 and extends below arms 122. Thus, should the mower attachment move into an abrupt depression, the arms 122 will engage bar 146 and prevent excessive downward movement of the mower attachment. If the attachment should rise relative to the tractor 134, alignment of the belt 138 with pulley 132 is maintained by conical guide rollers 150 rotatably mounted on a shaft 152 supported on bracket 154, FIG. 9.

In order to minimize the weight of the mower attachment which is carried by wheels 30, and thereby decrease the tendency to compress the grass before it is cut, and to increase the weight on the front drive wheels of the tractor 134, tension springs 156 are interposed between arms 122 and the front of the tractor. The springs 156 attach at ends 158 to the arms 122 and attach to the tractor at ends 160. Thus, springs 156 will directly impose a portion of the mower weight upon the tractor without interfering with the advantages of having the mower attachment directly guided and supported by wheels 30 and rollers 32. It will, therefore, be appreciated that at all times the vertical position of the mower attachment is determined by the wheels 30 and rollers 32, and that the tractor is merely providing the "push" and driving the mower blades. Only a small portion of the grass entering the housing 10 will have been compressed by the wheels 30 and, as the grass compression is slight, in that much of the weight of the mower attachment is transferred to the tractor, superior cutting characteristics are provided.

As will be apparent from FIG. 2, the ends of the outside blades 96 are disposed close to the adjacent housing side panels 18 and 20 where by the cutting action occurs very close to the panels to minimize trimming.

Also, as the wheels 30 and 32 are disposed inwardly of the housing side panels, the wheels do not interfere with the positioning of the mower housing immediately adjacent trees, walls, and other obstacles.

It is appreciated that various modifications to the invention may be apparent to those skilled in the art, without departing from the spirit and scope thereof, and it is intended that the invention be defined only by the scope of the following claims.

We claim:
1. A self-supporting rotary lawn mowing attachment comprising, in combination,
 (a) a housing,
 (b) at least one vertically disposed shaft mounted on said housing having a blade attachment end located within said housing,
 (c) a blade attached to said blade attachment end of said shaft,
 (d) a bracket mounted upon said housing,
 (e) a vertically disposed cylindrical bore defined in said bracket,
 (f) a cylindrical shaft received within said bore and axially adjustable therein,
 (g) a ground wheel rotatably suported on said cylindrical shaft,
 (h) a plurality of axially spaced circumferential grooves defined on said cylindrical shaft, said grooves each including an abutment shoulder,
 (i) a locking member mounted on said bracket including a cylindrical shaft engaging portion restrained against vertical upward movement relative to said bracket,
 (j) a shaft receiving opening defined in said locking member shaft engaging portion, said opening including a first portion of a larger diametrical dimension than said shaft and a second portion including opposed spaced edges adapted to be closely received within a shaft groove upon a groove being aligned with said shaft engaging portion to restrict axial movement of said cylindrical shaft within said bracket while permitting rotation of said shaft therein, and
 (k) biasing means biasing said locking member shaft engaging portion in a direction maintaining said opening second portion in engagement with an aligned shaft groove.

2. In a self-supporting rotary lawn mowing attachment as in claim 1 wherein:
 (a) said locking member is formed of a spring leaf material having a supported portion affixed to said bracket, a deflectable portion normally extending away from said bracket and said shaft engaging portion depending from said deflectable portion.

3. In a self-supporting lawn mowing attachment comprising, in combination,
 (a) a housing including side walls,
 (b) at least one vertically disposed shaft mounted on said housing having a blade attachment end located within said housing,
 (c) a blade attached to said blade attachment end of said shaft,
 (d) a wheel supporting bracket, said wheel supporting bracket having a U-cross-sectional configuration having a base portion and spaced leg portions depending from a common side of said base portion, terminating free edges defined on said leg portions,
 (e) a ground wheel rotatably mounted upon said bracket,
 (f) a threaded stud affixed to a side wall of said housing and extending therefrom,
 (g) an elongated slot defined in said bracket base portion, said bracket being placed over said stud whereby said stud extends through said slot and said leg portions terminating edges are disposed adjacent the associated side wall,
 (h) a plurality of circular openings defined in said bracket base portion of a diameter greater than the slot width and diametrically intersected by said slot, (i) a knob having a threaded bore adapted to mate with the thread defined on said stud, a bracket engaging surface defined on said knob, and (j) a cylindrical projection defined on said knob concentric with the threaded bore thereof and of a diameter slightly less than that of said circular openings whereby upon said bracket being positioned on said housing side wall such that said stud is concentric with a circular opening tightening of said knob on said stud engages said bracket engaging surface with said bracket base portion to frictionally engage said leg portion terminating edges with said side wall, and said knob projection is received within the opening concentric to said stud.

4. In a self-supporting lawn mowing attachment as in claim 3 wherein:

(a) a U-shaped strap bracket is mounted on said housing side wall in spaced relation to said threaded stud, said strap bracket including a base portion adapted to overlie said bracket base portion, and side portions adapted to receive said bracket leg portions therebetween.

5. A self-supporting lawn mowing attachment comprising, in combination, (a) a housing having a front portion and a rear side wall, (b) at least one vertically disposed shaft mounted on said housing having a blade attachment end located within said housing, (c) a blade attached to said blade attachment end of said shaft, (d) a pair of spaced brackets mounted upon the front portion of said housing, a vertically disposed bore defined in each of said brackets, (e) a shaft rotatably and axially adjustably received within each of said bores, (f) a ground wheel rotatably supported on each of said shafts, (g) a plurality of axially spaced annular grooves defined in each of said shafts, (h) shaft engaging means mounted upon each of said brackets having a shaft receiving opening defined therein, said opening including a first portion of a dimension greater than said shafts and a second portion adapted to closely be received within an aligned shaft groove while permitting rotation of said shafts relative to the associated bracket, (i) means biasing said shaft engaging means in the direction maintaining said openings second portion in engagement with an aligned shaft groove, (j) a pair of rear wheel supporting brackets, each of said rear wheel supporting brackets having a U-cross-sectional configuration having a base portion and spaced leg portions depending from a common side of said base portion, terminating free edges defined on said leg portions, (k) a pair of threaded studs affixed to said rear side wall in spaced relationship to each other, (l) an enlarged slot defined in each of said rear wheel bracket base portions, each of said brackets being placed over a stud whereby the stud extends through the slot and the bracket leg portions terminating edges are disposed adjacent the rear side wall for engagement therewith, a plurality of circular openings defined in each of said base portions of a diameter greater than the associated slot width and symmetrically intersected by said slot, (m) a knob having a threaded bore adapted to mate with the thread defined on said stud, a bracket engaging surface defined on said knob, and a cylindrical projection defined on said knob concentric with the threaded bore thereof and of a diameter slightly less than that of said circular openings whereby upon said bracket being positioned on said housing side wall such that said stud is concentric with a circular opening tightening of said knob on said stud engages said bracket engaging surface with said bracket base portion to frictionally engage said leg portion terminating edges with said side wall, and said knob projection is received within the opening concentric to said stud.

6. A self-supporting rotary lawn mower attachment adapted to be mounted ahead of motive and power driven means having a drive pulley, and pivotally mounted attachment mounting means selectively movable toward and away from the front of the motive and power driven means, comprising, in combination, (a) a housing having a front portion and a rear portion and an upper panel and side panels depending therefrom, (b) at least one vertically disposed shaft mounted on said housing having a blade attachment end located within said housing, (c) a blade attached to said blade attachment end of said shaft, (d) a belt pulley mounted on said shaft, (e) ground wheels mounted on said housing adapted to support said housing, (f) a pair of arms, each of said arms having a first end and a second end, (g) means pivotally attaching said first ends of said arms to said housing, (h) horizontally disposed pivot means defined on said second ends of said arms adapted to pivotally attach said arms to the motive and power driven means attachment mounting means whereby movement of said attachment mounting means selectively moves said housing and shaft-mounted pulley toward and away from the drive pulley between blade clutch and declutch positions, (i) a drive belt interposed between said pulleys adapted to drivingly interconnect the drive pulley with said shaft-mounted pulley upon said housing being moved away from said motive and power driven means, and (j) a pair of belt guide rollers rotatably mounted on the motive and drive means for rotation about an axis perpendicular to the axis of the drive pulley and located vertically above said belt substantially tangent to the usual belt position for engagement with said belt upon said shaft mounted pulley vertically rising a predetermined degree with respect to the drive pulley to maintain alignment of said belt with said pulleys upon vertical upward movement of the mower attachment.

7. A self-supporting rotary lawn mower attachment adapted to be mounted ahead of motive and power driven means having a drive pulley, and pivotally mounted attachment mounting means selectively movable toward and away from the front of the motive and power driven means, comprising, in combination, (a) a housing having a front portion and a rear portion, and an upper panel and side panels depending therefrom, (b) at least one vertically disposed shaft mounted on said housing having a blade attachment end located within said housing, (c) a blade attached to said blade attachment end of said shaft, (d) a belt pulley mounted on said shaft, (e) ground wheels mounted on said housing adapted to support said housing, (f) a pair of arms, each of said arms having a first end and a second end, (g) means pivotally attaching said first ends of said arms to said housing, (h) horizontally disposed pivot means defined on said second ends of said arms adapted to pivotally attach said arms to the motive and power driven means attachment mounting means whereby movement of said attachment mounting means selectively moves said housing and shaft-mounted pulley toward and away from the drive pulley between blade clutch and declutch positions, (i) a drive belt interposed between said pulleys adapted to drivingly interconnect the drive pulley with said shaft-mounted pulley upon said housing being moved away from said motive and power driven means, and (j) an arm movement limiting bar mounted on the motive and drive means disposed below said arms in normal spaced relation thereto and adapted to engage said arms and limit downward movement of said arms about said pivot means defined on said arm second ends.

References Cited by the Examiner

UNITED STATES PATENTS

| | | | |
|---|---|---|---|
| 1,269,413 | 6/1918 | Finnigan | 287—58 X |
| 1,482,954 | 2/1924 | Tideman | 16—19 |
| 2,688,833 | 9/1954 | Weiss et al. | 56—25.4 |
| 2,828,599 | 4/1958 | Haynes | 56—25.4 |
| 2,991,612 | 7/1961 | Holmes | 56—25.4 |
| 2,996,134 | 8/1961 | Muerle et al. | 56—25.4 |
| 3,135,079 | 6/1964 | Dunn | 56—6 |
| 3,152,431 | 10/1964 | Ott et al. | 56—6 X |
| 3,166,880 | 1/1965 | Robinson | 56—6 |

ABRAHAM G. STONE, *Primary Examiner.*

RUSSELL R. KINSEY, *Examiner.*

M. C. PAYDEN, *Assistant Examiner.*